(12) United States Patent
Takahashi et al.

(10) Patent No.: US 10,919,277 B2
(45) Date of Patent: Feb. 16, 2021

(54) STRETCHABLE FILM

(71) Applicant: C.I. Takiron Corporation, Osaka (JP)

(72) Inventors: Hideaki Takahashi, Konan (JP); Akira Hori, Ritto (JP); Tomomi Hirota, Nagoya (JP); Keiko Kimura, Ritto (JP)

(73) Assignee: C.I. Takiron Corporation, Osaka (JP)

( * ) Notice: Subject to any disclaimer, the term of this patent is extended or adjusted under 35 U.S.C. 154(b) by 69 days.

(21) Appl. No.: 15/326,877

(22) PCT Filed: Jul. 22, 2015

(86) PCT No.: PCT/JP2015/070833
§ 371 (c)(1),
(2) Date: Jan. 17, 2017

(87) PCT Pub. No.: WO2016/013577
PCT Pub. Date: Jan. 28, 2016

(65) Prior Publication Data
US 2017/0203554 A1  Jul. 20, 2017

(30) Foreign Application Priority Data
Jul. 22, 2014  (JP) .................................. 2014-149249

(51) Int. Cl.
*B32B 27/32* (2006.01)
*B32B 25/08* (2006.01)
(Continued)

(52) U.S. Cl.
CPC ............... *B32B 27/32* (2013.01); *B32B 7/04* (2013.01); *B32B 25/042* (2013.01); *B32B 25/08* (2013.01);
(Continued)

(58) Field of Classification Search
CPC ......... B32B 25/08; B32B 25/14; B32B 27/06; B32B 27/08; B32B 27/32; B32B 2307/51;
(Continued)

(56) References Cited

U.S. PATENT DOCUMENTS 4,082,877 A * 4/1978 Shadle .................... B32B 27/00
428/220
4,235,365 A * 11/1980 Yoshii .................... B32B 27/32
383/108
(Continued)

FOREIGN PATENT DOCUMENTS

CN 1308138 C 4/2007
JP A-63-195003 8/1988
(Continued)

OTHER PUBLICATIONS

Office Action in Chinese Patent Application No. 201580039018.5, dated Jan. 31, 2018.
(Continued)

*Primary Examiner* — Frank J Vineis
*Assistant Examiner* — Laura B Figg
(74) *Attorney, Agent, or Firm* — Knobbe Martens Olson & Bear LLP (57) ABSTRACT

A stretchable film including a stretchable film layer, a first skin layer disposed on the stretchable film layer on a first surface side, and a second skin layer disposed on the stretchable film layer on a second surface side, in which the stretchable film layer contains an elastomer, the first skin layer and the second skin layer contain a resin which does not have adhesiveness at 60° C., and the thickness of each of the first skin layer and the second skin layer is 0.1 μm to 4 μm.

19 Claims, 1 Drawing Sheet

(51) Int. Cl.
  *B32B 27/08* (2006.01)
  *B32B 25/14* (2006.01)
  *B32B 7/04* (2019.01)
  *B32B 25/04* (2006.01)
  *B32B 27/18* (2006.01)
  *B32B 27/06* (2006.01)

(52) U.S. Cl.
  CPC .............. *B32B 25/14* (2013.01); *B32B 27/06* (2013.01); *B32B 27/08* (2013.01); *B32B 27/18* (2013.01); *B32B 2250/03* (2013.01); *B32B 2250/24* (2013.01); *B32B 2250/40* (2013.01); *B32B 2264/10* (2013.01); *B32B 2264/101* (2013.01); *B32B 2264/102* (2013.01); *B32B 2264/104* (2013.01); *B32B 2264/12* (2013.01); *B32B 2270/00* (2013.01); *B32B 2307/21* (2013.01); *B32B 2307/3065* (2013.01); *B32B 2307/51* (2013.01); *B32B 2307/514* (2013.01); *B32B 2307/7145* (2013.01); *B32B 2307/732* (2013.01); *B32B 2307/734* (2013.01); *B32B 2307/746* (2013.01); *B32B 2309/105* (2013.01); *B32B 2323/04* (2013.01); *B32B 2323/10* (2013.01); *B32B 2437/00* (2013.01); *B32B 2439/00* (2013.01); *B32B 2439/80* (2013.01); *B32B 2535/00* (2013.01); *B32B 2555/00* (2013.01); *B32B 2555/02* (2013.01)

(58) Field of Classification Search
  CPC ........ B32B 2307/514; B32B 2307/732; B32B 2309/105; B32B 2323/04; B32B 2323/10; B32B 2439/00; B32B 2439/80; B32B 2555/00; B65D 71/08; B65D 75/006; B65D 75/00
  See application file for complete search history.

(56) References Cited

U.S. PATENT DOCUMENTS

| | | | |
|---|---|---|---|
| 2006/0172137 A1* | 8/2006 | Champion | B32B 27/08 428/421 |
| 2007/0141352 A1* | 6/2007 | Calhoun | A61F 13/15577 428/411.1 |
| 2010/0272379 A1 | 10/2010 | Hu et al. | |
| 2011/0041460 A1 | 2/2011 | Weisinger et al. | |

FOREIGN PATENT DOCUMENTS

| | | |
|---|---|---|
| JP | B-06-094188 | 11/1994 |
| JP | A-08-041317 | 2/1996 |
| JP | A-2001-277413 | 10/2001 |
| JP | A-2001-322216 | 11/2001 |
| JP | A-2003-311884 | 11/2003 |
| JP | 2004-050621 A | 2/2004 |
| JP | A-2006-506245 | 2/2006 |
| JP | 2008-538194 A | 10/2008 |
| JP | A-2010-279725 | 12/2010 |
| JP | A-2013-223935 | 10/2013 |
| JP | 2014-111368 A | 6/2014 |
| WO | WO 91/07277 A1 | 5/1991 |
| WO | WO 2004/043693 A1 | 5/2004 |
| WO | WO 2007/070130 A1 | 6/2007 |

OTHER PUBLICATIONS

International Search Report in International Application No. PCT/JP2015/070833, dated Oct. 27, 2015.

Search Report in European Patent Application No. 15825035.7, dated Nov. 17, 2017.

Office Action issued in Japanese Patent Application No. 2016-535950, dated Apr. 16, 2019.

Office Action issued in Japanese Patenet Application No. 2016-535950, dated Jul. 16, 2019.

* cited by examiner

STRETCHABLE FILM

This application is the U.S. National Phase under 35 U.S.C. § 371 of International Application PCT/JP2015/070833, filed Jul. 22, 2015, designating the U.S., and published in Japanese as WO 2016/013577 on Jan. 28, 2016, which claims priority to Japanese Patent Application No. 2014-149249, filed Jul. 22, 2014, the entire contents of which are incorporated herein by reference.

TECHNICAL FIELD

The present invention relates to a stretchable film.

Priority is claimed on Japanese Patent Application No. 2014-149249, filed on Jul. 22, 2014, the content of which is incorporated herein by reference.

BACKGROUND ART

In a sanitation field (a sanitary product, an incontinence product, and the like), a healthcare field (a surgical drape and the like), and the like, a stretchable film formed of an elastomer having stretching properties, or a composite in which the stretchable film is laminated with a non-woven fabric has been widely used. For example, a stretchable film formed by using a styrene-based elastomer is known as the stretchable film (for example, refer to Patent Document 1).

A stretchable film is manufactured by a cast film process method in many cases. However, an elastomer essentially has strong adhesiveness. For this reason, in a case where the elastomer is formed by the cast film process method, adhesion between films, so-called blocking occurs at the time of being wound into the shape of a roll after a film is formed. In a case where the blocking occurs, a stretchable film wound into the shape of a roll is not wound off, and thus, it is not possible to use the stretchable film or perform post-processing.

A method of adding an inorganic substance (an inorganic antiblocking agent) such as calcium carbonate, silica, and glass to a surface layer of a stretchable film is proposed as a method of suppressing the occurrence of the blocking (for example, refer to Patent Document 1).

CITATION LIST

Patent Literature

[Patent Document 1] Japanese Unexamined Patent Application, First Publication No. 2010-279725

SUMMARY OF INVENTION

Technical Problem

However, in the method described above, in a case of a change in a temperature at the time of transporting a roll-like film through a high temperature region such as the equator, high temperature storage such as storage in a warehouse in a summer season, and the like, the occurrence of the blocking is not sufficiently suppressed.

In addition, in a case where the inorganic substance is added to the stretchable film, the occurrence of the blocking is suppressed. On the other hand, a decrease in quality such as a degradation in film physical properties (in particular, an increase in permanent deformation) may occur.

An object of the present invention is to provide a stretchable film in which it is possible to suppress occurrence of blocking even in a case of performing high temperature transport or high temperature storage while suppressing a degradation in the physical properties of a film (in particular, an increase in permanent deformation).

Solution to Problem

A stretchable film of the present invention includes a stretchable film layer, a first skin layer disposed on the stretchable film layer on a first surface side, and a second skin layer disposed on the stretchable film layer on a second surface side, in which the stretchable film layer contains an elastomer, the first skin layer and the second skin layer contain a resin which does not have adhesiveness at 60° C., and the thickness of each of the first skin layer and the second skin layer is 0.1 μm to 4 μm.

In the stretchable film of the present invention, it is preferable that the elastomer contained in the stretchable film layer is an olefin-based elastomer.

In the stretchable film of the present invention, it is preferable that the elastomer contained in the stretchable film layer is a styrene-based elastomer.

In addition, it is preferable that a total thickness of the film is 8 μm to 150 μm.

In addition, it is preferable that each resin contained in the first skin layer and the second skin layer has compatibility with respect to the elastomer.

In addition, it is preferable that the first skin layer and the second skin layer are layers containing any one or both of polyethylene and polypropylene.

Advantageous Effects of Invention

In the stretchable film of the present invention, occurrence of blocking is sufficiently suppressed even in a case of performing high temperature transport or high temperature storage while suppressing a degradation in the physical properties of a film (in particular, an increase in permanent deformation).

DESCRIPTION OF EMBODIMENTS

Figure 1:
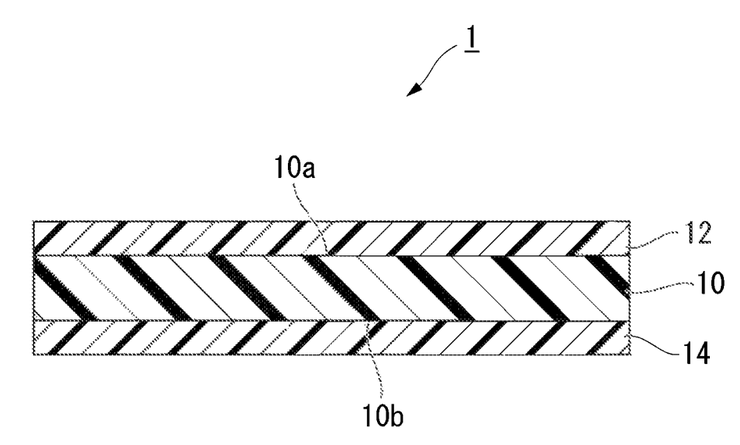
FIG. 1 is a sectional view showing an example of a stretchable film of the present invention.

A stretchable film of the present invention will be described by using a stretchable film 1 which is an exemplary example thereof and is shown in FIG. 1.

The stretchable film 1 of this embodiment includes a stretchable film layer 10, a first skin layer 12 disposed on the stretchable film layer 10 on a first surface 10a side, and a second skin layer 14 disposed on the stretchable film layer 10 on a second surface 10b side opposite to the first surface 10a.

[Stretchable Film Layer]

The stretchable film layer 10 is a layer containing an elastomer.

In addition, it is not necessary that the stretchable film layer 10 is a single layer, but the stretchable film layer 10 may be configured of a plurality of layers. Further, a pulverized/reuse raw material of a trimming portion which is generated in a step may be added/used in the stretchable film layer 10.

The stretchable film 1 includes the stretchable film layer 10, and thus, has stretching properties.

(Elastomer)

The elastomer indicates a polymer having rubber elasticity at a temperature of higher than or equal to a glass transition temperature. Therefore, in general, the elastomer has a glass transition temperature lower than or equal to an ordinary temperature (23° C.). Hereinafter, the elastomer used in the stretchable film layer will also be referred to as an elastomer (A).

Specifically, examples of the elastomer (A) include a styrene-based elastomer, an olefin-based elastomer, a urethane-based elastomer, a polyester-based elastomer, and the like. Among them, the olefin-based elastomer is preferable from the viewpoint of compatibility with respect to polyethylene/polypropylene used in a skin layer. In addition, the styrene-based elastomer is preferable from the viewpoint of high dimension stability at the time of transporting a film.

One type of the elastomer (A) may be independently used, or two or more types thereof may be used together.

Examples of the olefin-based elastomer include a copolymer or a homopolymer which contains olefin having greater than or equal to 3 carbon atoms as a main component, a copolymer with olefin having greater than or equal to 3 carbon atoms which contain ethylene as a main component, and the like.

Specifically, for example, a propylene homopolymer having low stereoregularity or an α-olefin homopolymer such as a 1-butene homopolymer; an α-olefin copolymer such as a propylene-ethylene copolymer, a propylene-ethylene-1-butene copolymer, a 1-butene-ethylene copolymer, a 1-butene-propylene copolymer, a 4-methyl pentene-1-propylene copolymer, a 4-methyl pentene-1-1-butene copolymer, a 4-methyl pentene-1-propylene-1-butene copolymer, a propylene-1-butene copolymer, an ethylene-propylene copolymer, an ethylene-hexene copolymer, and an ethylene-octene copolymer; an ethylene-α-olefin-diene terpolymer such as an ethylene-propylene-ethylidene norbornene copolymer, an ethylene-propylene-butadiene copolymer, and an ethylene-propylene-isoprene copolymer; and the like. In addition, an elastomer may be used in which the elastomer is dispersed in a matrix of crystalline polyolefin.

One type of the olefin elastomer may be independently used, or two or more types thereof may be used together.

A propylene-based elastomer (a propylene-ethylene copolymer and the like) which is a copolymer or a homopolymer containing propylene as a main component and an ethylene-based elastomer (an ethylene-octene copolymer and the like) which is a copolymer or a homopolymer containing ethylene as a main component are preferable, and the propylene-based elastomer is more preferable, as the olefin-based elastomer, from the viewpoint of the compatibility with respect to polyethylene/polypropylene used in the skin layer.

A glass transition temperature of the propylene-based elastomer is preferably lower than or equal to −10° C., and is more preferably lower than or equal to −25° C. In a case where the glass transition temperature of the propylene-based elastomer is lower than or equal to the upper limit value, it is possible to easily obtain excellent stretching properties.

A propylene unit content ratio with respect to the entire unit of the propylene-based elastomer is preferably 70 mass % to 95 mass %, and is more preferably 80 mass % to 90 mass %. In a case where the propylene unit content ratio is greater than or equal to the lower limit value, it is possible to easily obtain excellent formability. In a case where the propylene unit content ratio is less than or equal to the upper limit value, it is possible to easily obtain excellent stretching properties.

It is possible to use a commercially available product as the olefin-based elastomer.

Examples of the commercially available product of the olefin-based elastomer include Product Name "Vistamaxx 6102" (a propylene-ethylene copolymer, glass transition temperature: −32° C., ethylene unit content ratio: 16 mass %, manufactured by Exxon Mobil Corporation), Product Name "Vistamaxx 3020" (a propylene-ethylene copolymer, glass transition temperature: −26° C., ethylene unit content ratio: 11 mass %, manufactured by Exxon Mobil Corporation), Product Name "Infuse 9107" (an ethylene-octene copolymer, glass transition temperature: −62° C., manufactured by The Dow Chemical Company), Product Name "Infuse 9507" (an ethylene-octene copolymer, glass transition temperature: −62° C., manufactured by The Dow Chemical Company), and the like.

Examples of the styrene-based elastomer include a styrene-isoprene-styrene block copolymer, a styrene-isoprene block copolymer, a styrene-butadiene-styrene block copolymer, a styrene-butadiene block copolymer, a hydrogen additive of a styrene-isoprene-styrene block copolymer (a styrene-ethylene-propylene-styrene block copolymer), a hydrogen additive of a styrene-butadiene-styrene block copolymer (a styrene-ethylene-butylene-styrene block copolymer), and the like. Among them, the styrene-isoprene-styrene block copolymer is preferable due to higher strength and higher restorability.

It is preferable that a styrene unit content ratio of the styrene-isoprene-styrene block copolymer is 14 mass % to 48 mass %. In a case where the styrene unit content ratio of the styrene-isoprene-styrene block copolymer is greater than or equal to the lower limit value, the formability is improved, and in a case where the styrene unit content ratio of the styrene-isoprene-styrene block copolymer is less than or equal to the upper limit value, it is possible to obtain sufficiently high elasticity.

One type selected from the group consisting of a propylene-based elastomer and an ethylene-based elastomer is preferable as the elastomer (A), from the viewpoint of the compatibility with respect to polyethylene/polypropylene used in the skin layer. However, a mixture of two or more types of elastomers may be used.

In addition, a styrene-based elastomer is preferable as the elastomer (A), from the viewpoint of high dimension stability at the time of transporting a film. However, a mixture of two or more types of styrene-based elastomers may be used.

(Other Components)

The stretchable film layer 10 may contain other components in addition to the elastomer (A) insofar as the other components do not impair stretching properties of the stretchable film 1.

Examples of the other components include an inorganic antiblocking agent. The inorganic antiblocking agent will be described in detail in the description of the skin layer. The inorganic antiblocking agent may be added in master batch. In addition, for example, in order to set the inorganic antiblocking agent in the master batch, other resins such as an olefin-based resin (polyethylene, polystyrene, and the like) may be contained in addition to the elastomer (A). One type of resin may be independently used, or two or more thereof may be used together.

In addition, an additive such as an amide-based antiblocking agent (stearic acid amide and the like), an antioxidant, a weathering stabilizer, an antistatic agent, an antifog agent, a metal soap, a wax, an antifungal agent, an antibacterial agent, a nucleating agent, a flame retardant, and a lubricant may be contained. One type of such an additive may be independently used, or two or more types thereof may be used together.

Examples of the amide-based antiblocking agent include Product Name "AP-1" (manufactured by Nippon Kasei Chemical Co., Ltd.), and the like.

The additive described above can also be added in master batch, as with an adding method of the inorganic antiblocking agent.

Examples of the master batch of the amide-based antiblocking agent include Product Name "Rikemaster EXR-040" (stearic acid amide-containing master batch (content ratio of stearic acid amide: 15 mass %), base resin: polyethylene, manufactured by RIKEN VITAMIN CO., LTD.), and the like.

(Proportion of Each Component in Stretchable Film Layer)

The amount of the elastomer (A) in the stretchable film layer 10 (100 mass %) is preferably greater than or equal to 70 mass %, and is more preferably greater than or equal to 80 mass %. In a case where the amount of the elastomer (A) is greater than or equal to the lower limit value, it is possible to easily obtain excellent stretching properties. The upper limit value of the amount of the elastomer (A) is 100 mass %.

It is preferable that the proportion of the other resins in the stretchable film layer 10 is 0 mass % to 20 mass % with respect to the total amount of the resin component. In a case where the proportion of the other resin is less than or equal to the 20 mass %, it is possible to easily obtain excellent stretching properties.

(Thickness of Stretchable Film Layer)

The thickness of the stretchable film layer 10 is preferably 5 µm to 148.6 µm, is more preferably 15 µm to 98.6 µm, and is even more preferably 28.6 µm to 68.6 µm. In a case where the thickness of the stretchable film layer 10 is greater than or equal to the lower limit value, a stretching force of the entire stretchable film 1 is sufficiently obtained, and thus, it is possible to sufficiently obtain a contraction force at the time of applying the stretchable film 1 to a product. In a case where the thickness of the stretchable film layer 10 is less than or equal to the upper limit value, it is possible to prevent a contraction force at the time of applying the stretchable film 1 to a product from being excessively strong due to an excessive stretching force of the entire stretchable film 1.

In this example, the stretchable film layer 10 is a single layer, but may be a multilayer of two or more layers. In a case where the stretchable film layer 10 is a multilayer, compositions or thicknesses of each layer may be the same as each other, or may be different from each other.

The thickness of the stretchable film layer 10 in a case where the stretchable film layer 10 is a multilayer indicates the total thickness of the multilayer.

[Skin Layer]

Each of the first skin layer 12 and the second skin layer 14 is a layer containing a resin which does not have adhesiveness at 60° C. (hereinafter, referred to as a resin (B)). The stretchable film 1 includes the first skin layer 12 and the second skin layer 14, and thus, adhesiveness with respect to the surface of the film decreases. Therefore, blocking is prevented from occurring even in a case of being wound into the shape of a roll after a film is formed, and peeling properties from the vacuum roll (surface slipperiness) at the time of transporting the film by using a vacuum roll are retained. In addition, in a case where the elastomer (A) forming the stretchable film layer 10 is an olefin-based elastomer, it is preferable that the resin (B) has compatibility with respect to the elastomer (A).

Furthermore, the resin not having adhesiveness at 60° C. indicates that an "extrapolated onset temperature" of a resin at a DSC melting peak is higher than or equal to 60° C. (refer to Japanese Industrial Standards JIS K0129). Furthermore, the "extrapolated onset temperature" indicates a temperature at an intersection point between a straight line drawn by extending a base line of a DSC curve on a low temperature side to a high temperature side and a tangent line drawn at a point where a gradient in the curve of the peak on the low temperature side is maximized, in heating measurement. In addition, the resin having compatibility with respect to the elastomer (A) indicates that the same structure as that of the elastomer (A) which is used in the stretchable film layer 10 is in a molecular chain structure of the resin (for example, an ethylene skeleton, a propylene skeleton, and the like).

(Resin (B))

Examples of the resin (B) include an olefin-based resin such as polyethylene and polypropylene. One type of the resin (B) may be independently used, or two or more types thereof may be used together.

In a case where the elastomer (A) used in the stretchable film layer 10 is an olefin-based elastomer, any one or both of polyethylene and polypropylene are preferable as the resin (B), from the viewpoint of the compatibility.

(Inorganic Antiblocking Agent)

It is preferable that the first skin layer 12 and the second skin layer 14 contain an inorganic antiblocking agent, from the viewpoint of easily obtaining excellent antiblocking properties by imparting slipperiness onto the surface of the film.

The inorganic antiblocking agent contained in the first skin layer 12 and the second skin layer 14 is not particularly limited, and it is possible to use an inorganic compound which is generally used as an antiblocking agent. Specific examples of the inorganic antiblocking agent include calcium carbonate, zeolite, silica, glass, and the like.

It is preferable that the inorganic antiblocking agent is in the shape of a particle.

It is preferable that a particle diameter of the inorganic antiblocking agent is 2 µm to 10 µm. In a case where the particle diameter of the inorganic antiblocking agent is greater than or equal to the lower limit value, the slipperiness is improved. In a case where the particle diameter of the inorganic antiblocking agent is less than or equal to the upper limit value, the texture becomes excellent.

Furthermore, the particle diameter of the inorganic antiblocking agent indicates the average particle diameter of 10 points measured by using a scanning microscope (JSM6460LA, manufactured by JEOL Ltd.).

One type of the inorganic antiblocking agent may be independently used, or two or more types thereof may be used together.

In the present invention, in a case where the inorganic antiblocking agent is used, the inorganic antiblocking agent may be used in master batch (hereinafter, also referred to as master batch (C)). Examples of a base resin of the master batch (C) include polyethylene, polypropylene, and the like, and polyethylene is preferable from the viewpoint of general versatility.

Examples of a commercially available product of the master batch (C) include Product Name "TEP 1HC783 WHT" (calcium carbonate (particle diameter: 5 µm, content ratio: 50 mass %), base resin: polyethylene, manufactured by Hanil Toyo Co., Ltd.), Product Name "PE180NLD2" (calcium carbonate (particle diameter: 5 µm, content ratio:

50 mass %), base resin: polyethylene, manufactured by Sunplac Corporation), Product Name "KINOPLUS EMB-7A2806AC" (zeolite (particle diameter: 2 μm, content ratio: 20 mass %), base resin: polyethylene, manufactured by SUMIKA COLOR CO., LTD.), Product Name "SMOOTH MASTER S" (silica (a particle diameter of 10 μm, content ratio: 20 mass %), base resin: polyethylene, manufactured by Dainichiseika Color & Chemicals Mfg. Co., Ltd.), and the like.

One type of the master batch (C) may be independently used, or two or more types thereof may be used together. In addition, in general, master batch is used by adding a resin component and by diluting the concentration thereof to a desired concentration, and forming may be performed by using the master batch itself In a case where the master batch (C) is used in the first skin layer 12 and the second skin layer 14, the resin (B) is preferable as the base resin of the master batch (C). In this case, the first skin layer 12 and the second skin layer 14 may be formed by using the master batch (C) and the resin (B) together, or the first skin layer 12 and the second skin layer 14 may be formed by only using the master batch (C).

(Other Components)

The first skin layer 12 and the second skin layer 14 may contain other components in addition to the resin (B) and the inorganic antiblocking agent described above, insofar as the other components do not impair the stretching properties of the stretchable film 1.

Specifically, for example, an additive such as an amide-based antiblocking agent (stearic acid amide and the like), an antioxidant, a weathering stabilizer, an antistatic agent, an antifog agent, a metal soap, a wax, an antifungal agent, an antibacterial agent, a nucleating agent, a flame retardant, and a lubricant may be contained. One type of such an additive may be independently used, or two or more types thereof may be used together.

It is possible to use the additive described above in master batch, as with a case of the stretchable film layer.

(Proportion of Each Component in Skin Layer)

The amount of the resin (B) in the first skin layer 12 (100 mass %) is preferably 10 mass % to 90 mass %, and is more preferably 15 mass % to 85 mass %. In a case where the amount of the resin (B) is greater than or equal to the lower limit value, the occurrence of the blocking is easily suppressed in a roll-like stretchable film, even at the time of performing high temperature transport or high temperature storage.

The same applies to the amount of the resin (B) in the second skin layer 14.

Furthermore, in a case where a resin corresponding to the resin (B) is used as the base resin of the master batch used in the skin layer, the amount of the resin (B) also includes the amount of the resin corresponding to the resin (B).

The proportion of the inorganic antiblocking agent with respect to the total mass of the resin (B) and the inorganic antiblocking agent in the first skin layer 12 is preferably 10 mass % to 90 mass %, and is more preferably 15 mass % to 85 mass %. In a case where the proportion of the inorganic antiblocking agent is greater than or equal to the lower limit value, the occurrence of the blocking is easily suppressed in the roll-like stretchable film, even at the time of performing transport in a high temperature environment or storage in a high temperature environment. In a case where the proportion of the inorganic antiblocking agent is less than or equal to the upper limit value, pores are easily prevented from being formed on a film at the time of forming the film.

The same applies to the proportion of the inorganic antiblocking agent in the second skin layer 14.

(Thickness of Skin Layer)

The thickness of the first skin layer 12 is 0.1 μm to 4 μm, is preferably 0.3 μm to 2.7 μm, and is more preferably 0.9 μm to 2.5 μm. In a case where the thickness of the first skin layer 12 is greater than or equal to the lower limit value, the adhesiveness with respect to the surface of the stretchable film 1 sufficiently decreases, and thus, the occurrence of the blocking is suppressed even in a case of performing high temperature storage. In a case where the thickness of the first skin layer 12 is less than or equal to the upper limit value, the stretching properties of the entire stretchable film 1 are sufficiently obtained, and a degradation in the physical properties of a film (in particular, an increase in permanent deformation) is suppressed.

From the same reason as that of the first skin layer 12, the thickness of the second skin layer 14 is 0.1 μm to 4 μm, is preferably 0.3 μm to 2.7 μm, and is more preferably 0.9 μm to 2.5 μm.

Compositions and thicknesses of the first skin layer 12 and the second skin layer 14 may be the same as each other, or may be different from each other.

The film total thickness of the stretchable film 1 is preferably 8 μm to 150 μm, is more preferably 15 μm to 100 μm, and is even more preferably 30 μm to 70 μm. In a case where the film total thickness of the stretchable film layer 10 is greater than or equal to the lower limit value, it is possible to sufficiently obtain the stretching force of the entire stretchable film 1, and thus, it is possible to sufficiently obtain the contraction force at the time of applying the stretchable film 1 to the product. In a case where the film total thickness of the stretchable film layer 10 is less than or equal to the upper limit value, it is possible to prevent the contraction force at the time of applying the stretchable film 1 to the product from being excessively strong due to an excessive stretching force of the entire stretchable film 1.

[Manufacturing Method]

A manufacturing method of the stretchable film of the present invention is not particularly limited, and examples of the manufacturing method include a method including a mixing step and a forming step described below.

Mixing Step: The respective components forming the stretchable film layer 10, the first skin layer 12, and the second skin layer 14 are mixed, and thus, each mixture is obtained.

Forming Step: The mixture for forming the stretchable film layer 10, the mixture for forming the first skin layer 12, and the mixture for forming the second skin layer 14 are formed into the shape of a film, and thus, the stretchable film 1 is obtained.

(Mixing Step)

A method of mixing the respective components forming the stretchable film layer 10, the first skin layer 12, and the second skin layer 14 is not particularly limited, and examples of the method include a method using various mixers such as a Henschel mixer, a tumbler mixer, a Banbury mixer, and a kneader.

A mixing sequence of the respective components forming the stretchable film layer 10, the first skin layer 12, and the second skin layer 14 is not particularly limited. For example, all of the components may be mixed at one time. In addition, the mixture for forming the stretchable film layer 10 may be formed by obtaining the master batch (C) formed of the inorganic antiblocking agent and the base resin, and then, by mixing the master batch (C) with the elastomer (A). Further, the mixtures for forming the first skin layer 12 and the second skin layer 14 may be formed by obtaining the master batch (C) formed of the inorganic antiblocking agent and the base resin, and then, by mixing the master batch (C) with the resin (B).

(Forming Step)

A forming method is not particularly limited, and examples of the forming method include an inflation method, a cast film process method, and the like, and the cast film process method is preferable from the viewpoint of productivity.

Furthermore, the manufacturing method of the stretchable film of the present invention is not limited to the method described above. For example, in a case where one or more of the stretchable film layer, the first skin layer, and the second skin layer are formed of one component of the elastomer (A) or the resin (B), the component forming the layers may not be subjected to the mixing step.

[Function Effect]

As described above, in the stretchable film of the present invention, the first skin layer and the second skin layer having a specific thickness which is formed of the resin (B) are disposed on both surface sides of a stretchable film layer having a specific thickness which is formed of the elastomer (A). For this reason, the occurrence of the blocking is sufficiently suppressed even in a case of performing transport in a high temperature environment or storage in a high temperature environment while suppressing a degradation in the physical properties (in particular, an increase in the permanent deformation), and thus, the peeling properties from the vacuum roll (the surface slipperiness) at the time of transporting the film by using the vacuum roll are retained.

Furthermore, the stretchable film of the present invention is not limited to the stretchable film 1 described above. For example, the stretchable film of the present invention may be a stretchable film in which a stretchable film layer is a multilayer of two or more layers.

EXAMPLES

Hereinafter, the present invention will be described in detail by examples, but the present invention is not limited thereto.

[Raw Material]

Raw materials used in this example will be described below.

(Elastomer (A))

A-1: Product Name "Vistamaxx 6102" (a propylene-ethylene copolymer, glass transition temperature: −32° C., an ethylene unit content ratio of 16 mass %, manufactured by Exxon Mobil Corporation).

A-2: Product Name "Vistamaxx 3020" (a propylene-ethylene copolymer, glass transition temperature: −26° C., an ethylene unit content ratio of 11 mass %, manufactured by Exxon Mobil Corporation)

A-3: Product Name "Infuse 9107" (an ethylene-octene copolymer, glass transition temperature: −62° C., manufactured by The Dow Chemical Company).

A-4: Product Name "Infuse 9507" (an ethylene-octene copolymer, glass transition temperature: −62° C., manufactured by The Dow Chemical Company).

A-5: Product Name "Quintac 3390" (a styrene-isoprene-styrene block copolymer, glass transition temperature: −52° C., manufactured by Zeon Corporation).

(Resin (B))

B-1: Product Name "Kernel KM284" (polyethylene, manufactured by Japan Polyethylene Corporation).

B-2: Product Name "Zelas 7025" (polypropylene, manufactured by Mitsubishi Chemical Corporation).

B-3: Product Name "Sumikathene CE3506" (polyethylene, manufactured by Sumitomo Chemical Company, Limited).

(Master Batch (C))

C-1: Product Name "Rikemaster EXR-040" (stearic acid amide-containing master batch (content ratio of stearic acid amide: 15 mass %), base resin: polyethylene, manufactured by RIKEN VITAMIN CO., LTD.).

C-2: Product Name "TEP 1HC783 WHT" (calcium carbonate (content ratio: 50 mass %), base resin: polyethylene, manufactured by Hanil Toyo Co., Ltd.).

C-3: Product Name "PE180NLD2" (calcium carbonate (content ratio: 50 mass %), base resin: polyethylene, manufactured by Sunplac Corporation).

C-4: Product Name "KINOPLUS EMB-7A2806AC" (zeolite (content ratio: 20 mass %, base resin: polyethylene, manufactured by SUMIKA COLOR CO., LTD.).

C-5: Product Name "SMOOTH MASTER S" (silica (content ratio: 20 mass %, base resin: polyethylene, manufactured by Dainichiseika Color & Chemicals Mfg. Co., Ltd.).

(Amide-Based Antiblocking Agent (D))

D-1: Product Name "AP-1" (manufactured by Nippon Kasei Chemical Co., Ltd.).

Example 1 (Example)

89 parts by mass of a component (A-1), 7 parts by mass of a component (C-1), and 5 parts by mass of a component (C-2) were mixed by a tumbler mixer, and thus, a mixture was obtained. Next, a stretchable film which had a three-layer configuration including a stretchable film layer formed of the mixture, and a first skin layer and a second skin layer formed of 100 parts by mass of the component (c-2) on both surface sides of the stretchable film layer was obtained by a cast film process method. The thickness of the stretchable film layer was 46 μm, and the thickness of each of the first skin layer and the second skin layer was 2 μm.

Example 2 to Example 19, and Example 25 (Examples)

A stretchable film was obtained by the same method as that in Example 1 except that the composition of each component of the stretchable film layer, the first skin layer, and the second skin layer, and the thickness of each of the layers were changed as shown in Table 1 and Table 2. In a case where two or more types of components forming the first skin layer and the second skin layer were used, a mixture was obtained by mixing the components with a tumbler mixer, and then, a cast film process method was performed by using the mixture.

Example 20 to Example 24 (Comparative Examples)

A mixture for forming a stretchable film layer was obtained by the same method as that in Example 1 except that the composition of each of the components was changed as shown in Table 2 and Table 3. Next, the obtained mixture was extruded and formed at 200° C. by using an extruder including a T die (manufactured by Sumitomo Heavy Industries Modern, Ltd.), and thus, a stretchable film of a single layer having a thickness of 50 μm was obtained.

Example 26 and Example 27 (Comparative Examples)

A stretchable film was obtained by the same method as that in Example 1 except that the composition of each component of the stretchable film layer, the first skin layer, and the second skin layer, and the thickness of each of the layers were changed as shown in Table 3.

Example 28 to Example 32 (Examples)

A stretchable film was obtained by the same method as that in Example 1 except that the composition of each component of the stretchable film layer, the first skin layer, and the second skin layer, and the thickness of each of the layers were changed as shown in Table 4.

Example 33 and Example 34 (Comparative Examples)

A stretchable film was obtained by the same method as that in Example 1 except that the composition of each component of the stretchable film layer, the first skin layer, and the second skin layer, and the thickness of each of the layers were changed as shown in Table 4. In a case where two or more types of components forming the first skin layer and the second skin layer were used, a mixture was obtained by mixing the components with a tumbler mixer, and then, a cast film process method was performed using the mixture.

Example 35 to Example 38 (Examples)

A stretchable film was obtained by the same method as that in Example 1 except that the composition of each component of the stretchable film layer, the first skin layer, and the second skin layer, and the thickness of each of the layers were changed as shown in Table 5.

Example 39 (Comparative Example)

A mixture for forming a stretchable film layer was obtained by the same method as that in Example 1 except that the composition of each of the components was changed as shown in Table 5. Next, the obtained mixture was extruded and formed at 200° C. by using an extruder including a T die (manufactured by Sumitomo Heavy Industries Modern, Ltd.), and thus, a stretchable film of a single layer having a thickness of 30 μm was obtained.

[Measurement Method of Thickness]

The thickness of the stretchable film layer and the skin layer (the first skin layer and the second skin layer) in the stretchable film obtained in each of the examples was obtained by a method defined in JIS K7130 (ISO4591 and ISO4593). The thickness of the first skin layer was equal to the thickness of the second skin layer, and in Table 1 to Table 3, "Thickness of Skin Layer" indicated the thickness of each of the first skin layer and the second skin layer.

[Compatibility Between Elastomer (A) Formed of Olefin-Based Elastomer and Resin (B)]

The presence or absence of the compatibility between the elastomer (A) and the resin (B) (here, also containing the base resin of the master batch (C)) was determined according to whether or not the elastomer (A) and the resin (B) had the same skeleton (an ethylene skeleton and a propylene skeleton).

[Evaluation Method]

An evaluation method of the stretchable film obtained in each of the examples will be described below.

(Presence or Absence of Blocking)

100 m of the length of the stretchable film of each of the examples was wound by using a winding core having a diameter of 9 cm, was stored at 23° C. (an ordinary temperature) for 1 day, and then, was manually fed, and at this time, the presence or absence of the blocking was determined from feeding properties (pulling out properties) in the vicinity of the winding core. In addition, even in a case where the wound film was stored at 60° C. (a high temperature) for 1 day, the presence or absence of the blocking was similarly determined.

The determination of presence or absence of the blocking was performed as described below by using the same winding core in all of the examples, and by setting a load required for rotating only the winding core to A (N/25 mm).

A case where a load required for performing feeding was less than A+1 (N/25 mm) was determined as "Absent"

A case where the load required for performing feeding was greater than A+a contraction force at the time of performing stretching of MD 200% (N/25 mm) in each of the examples was determined as "Present" (in this case, the stretchable film fractured)

A case where the load required for performing feeding was greater than or equal to A+1 and less than or equal to A+the contraction force at the time of performing stretching of MD 200% (N/25 mm) in each of the examples was determined as "Blocking Partially Presents"

(Surface Slipperiness)

A test piece having a length (MD) of 40 cm and a width (TD) of 30 cm was cut from the stretchable film of each of the examples which was stored at 23° C. (an ordinary temperature) for 1 day, and was bonded onto a glass plate including a smooth surface. A surface onto which the stretchable film was bonded was set as an upper side, and the plate was retained at an angle of 30° from a horizontal surface.

A slippery piece having a smooth surface (10 cm×10 cm, a weight of 123 g) was gently placed on the stretchable film on the plate retained at the angle described above, and surface slipperiness was evaluated according to whether or not the slippery piece was moved.

Furthermore, glass and aluminum were used as a surface material of the slippery piece.

A case where the slippery piece was moved was evaluated as excellent, and a case where the slippery piece was not moved was evaluated as poor.

(Permanent Deformation)

A sample having a width of 100 mm in a longitudinal direction (MD) and a width of 25 mm in a width direction (TD) was cut from the stretchable film of each of the examples into the shape of a reed. The obtained sample was fixed by a gripper of Trapezium 2 (an autograph) (manufactured by SHIMADZU CORPORATION) such that a gripper distance became 25 mm. Next, stretching of 200% was performed in TD at a velocity of 254 mm/minute, and then, was retained for 30 seconds. After 30 seconds, the sample returned to be in an original state at the same velocity.

Permanent deformation at the time that the load of the sample (N/25 mm) became 0 when the sample returned to the original state from a stretched state was measured. Similarly, permanent deformation in a case of being stretched in MD was also measured. Here, in Example 35 to Example 39, stretching properties in MD did not exist due to alignment at the time of being formed, and thus, the permanent deformation in a case of being stretched in MD was not measured.

(Contraction Force at Time of Performing Stretching of 200%)

A sample having a width of 100 mm in the longitudinal direction (MD) and a width of 25 mm in the width direction (TD) was cut from the stretchable film of each of the examples into the shape of a reed. The obtained sample was fixed by a gripper of Trapezium 2 (an autograph) (manufactured by SHIMADZU CORPORATION) such that a gripper distance became 25 mm. Next, stretching of 200% was performed in TD at a velocity of 254 mm/minute, and at this time, a load (N/25 mm) was measured as the contraction force at the time of stretching 200%. Similarly, the contraction force at the time of stretching 200% in a case of being stretched in MD was also measured. Here, in Example 35 to Example 39, stretching properties in MD did not exist due to alignment at the time of being formed, and thus, the permanent deformation in a case of being stretched in MD was not measured.

The composition and the thickness of each layer of the stretchable film of each of the examples, and the evaluation results are shown in Table 1 to Table 5. Furthermore, in Example 1 to Example 39, all compositions of the first skin layer and the second skin layer were identical to each other, and each of the compositions was shown in Table 1 to Table 5 as the skin layer.

TABLE 1

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|
| STRETCHABLE FILM LAYER | ELASTOMER (A) | A-1 | 89 | 89 | 89 | 89 | 89 | 89 | 89 | 89 | 100 |
| | | A-2 | — | — | — | — | — | — | — | — | — |
| | | A-3 | — | — | — | — | — | — | — | — | — |
| | | A-4 | — | — | — | — | — | — | — | — | — |
| | MASTER BATCH (C) | C-1 | 7 | 7 | 7 | 7 | 7 | 7 | 7 | 7 | — |
| | | C-2 | 5 | — | 5 | 5 | 5 | 5 | 5 | 5 | — |
| | | C-3 | — | 5 | — | — | — | — | — | — | — |
| | THICKNESS [μm] | | 46 | 46 | 6 | 16 | 26 | 66 | 96 | 146 | 46 |
| SKIN LAYER | RESIN (B) | B-1 | — | — | — | — | — | — | — | — | — |
| | | B-2 | — | — | — | — | — | — | — | — | — |
| | MASTER BATCH (C) | C-2 | 100 | 100 | 100 | 100 | 100 | 100 | 100 | 100 | 100 |
| | | C-3 | — | — | — | — | — | — | — | — | — |
| | | C-4 | — | — | — | — | — | — | — | — | — |
| | | C-5 | — | — | — | — | — | — | — | — | — |
| | THICKNESS [μm] | | 2 | 2 | 2 | 2 | 2 | 2 | 2 | 2 | 2 |
| TOTAL THICKNESS OF FILM [μm] | | | 50 | 50 | 10 | 20 | 30 | 70 | 100 | 150 | 50 |
| COMPATIBILITY BETWEEN ELASTOMER (A) AND RESIN (B) | | | PRESENT | PRESENT | PRESENT | PRESENT | PRESENT | PRESENT | PRESENT | PRESENT | PRESENT |
| PRESENCE OR ABSENCE OF BLOCKING | ORDINARY TEMPERATURE | | ABSENT | ABSENT | ABSENT | ABSENT | ABSENT | ABSENT | ABSENT | ABSENT | ABSENT |
| | HIGH TEMPERATURE | | ABSENT | ABSENT | ABSENT | ABSENT | ABSENT | ABSENT | ABSENT | ABSENT | ABSENT |
| PERMANENT DEFORMATION [%] | MD | | 34 | 34 | 46 | 43 | 41 | 30 | 22 | 8 | 30 |
| | TD | | 28 | 28 | 36 | 35 | 33 | 29 | 26 | 20 | 25 |
| CONTRACTION FORCE AT TIME OF STRETCHING 200% [N/25 mm] | MD | | 6.58 | 6.60 | 2.69 | 3.19 | 3.69 | 5.68 | 7.18 | 9.67 | 6.90 |
| | TD | | 2.64 | 2.50 | 0.90 | 1.37 | 1.83 | 3.69 | 5.09 | 7.41 | 2.90 |
| SURFACE SLIPPERINESS | | | EXCELLENT | EXCELLENT | EXCELLENT | EXCELLENT | EXCELLENT | EXCELLENT | EXCELLENT | EXCELLENT | EXCELLENT |

TABLE 2

| | | | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|---|---|
| STRETCHABLE FILM LAYER | ELASTOMER (A) | A-1 | — | — | — | 89 | 89 | 89 | 89 | 89 | 89 |
| | | A-2 | 100 | — | — | — | — | — | — | — | — |
| | | A-3 | — | 100 | — | — | — | — | — | — | — |
| | | A-4 | — | — | 100 | — | — | — | — | — | — |
| | MASTER BATCH (C) | C-1 | — | — | — | 7 | 7 | 7 | 7 | 7 | 7 |
| | | C-2 | — | — | — | 5 | 5 | 5 | 5 | 5 | 5 |
| | | C-3 | — | — | — | — | — | — | — | — | — |
| | THICKNESS [μm] | | 46 | 46 | 46 | 46 | 46 | 46 | 46 | 46 | 166 |
| SKIN LAYER | RESIN (B) | B-1 | — | — | — | — | — | — | 50 | — | — |
| | | B-2 | — | — | — | — | — | — | — | 50 | — |
| | MASTER BATCH (C) | C-2 | 100 | 100 | 100 | — | — | — | 50 | 50 | 100 |
| | | C-3 | — | — | — | 100 | — | — | — | — | — |
| | | C-4 | — | — | — | — | 100 | — | — | 50 | — |
| | | C-5 | — | — | — | — | — | 100 | — | — | — |
| | THICKNESS [μm] | | 2 | 2 | 2 | 2 | 2 | 2 | 2 | 2 | 2 |

TABLE 2-continued

|  |  | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|---|
| TOTAL THICKNESS OF FILM [μm] | | 50 | 50 | 50 | 50 | 50 | 50 | 50 | 50 | 170 |
| COMPATIBILITY BETWEEN ELASTOMER (A) AND RESIN (B) | | PRESENT | PRESENT | PRESENT | PRESENT | PRESENT | PRESENT | PRESENT | PRESENT | PRESENT |
| PRESENCE OR ABSENCE OF BLOCKING | ORDINARY TEMPERATURE | ABSENT | ABSENT | ABSENT | ABSENT | ABSENT | ABSENT | ABSENT | ABSENT | ABSENT |
| | HIGH TEMPERATURE | ABSENT | ABSENT | ABSENT | ABSENT | ABSENT | ABSENT | ABSENT | ABSENT | ABSENT |
| PERMANENT DEFORMATION [%] | MD | 31 | 30 | 35 | 35 | 40 | 42 | 37 | 39 | 3 |
| | TD | 26 | 27 | 37 | 27 | 30 | 31 | 28 | 30 | 18 |
| CONTRACTION FORCE AT TIME OF STRETCHING 200% [N/25 mm] | MD | 6.85 | 3.50 | 2.23 | 6.55 | 6.00 | 5.70 | 6.50 | 6.20 | 10.67 |
| | TD | 2.95 | 2.94 | 2.32 | 2.60 | 2.30 | 2.00 | 2.40 | 2.50 | 8.34 |
| SURFACE SLIPPERINESS | | EXCELLENT | EXCELLENT | EXCELLENT | EXCELLENT | EXCELLENT | EXCELLENT | EXCELLENT | EXCELLENT | EXCELLENT |

TABLE 3

|  |  |  | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 |
|---|---|---|---|---|---|---|---|---|---|---|---|---|
| STRETCHABLE FILM LAYER | ELASTOMER (A) | A-1 | 89 | 89 | 84 | 79 | 74 | 64 | 89 | 89 | 89 |
| | | A-2 | — | — | — | — | — | — | — | — | — |
| | | A-3 | — | — | — | — | — | — | — | — | — |
| | | A-4 | — | — | — | — | — | — | — | — | — |
| | MASTER BATCH (C) | C-1 | 7 | 7 | 7 | 7 | 7 | 7 | 7 | 7 | 7 |
| | | C-2 | 5 | 5 | 5 | 10 | 15 | 20 | 30 | 5 | 5 |
| | | C-3 | — | — | — | — | — | — | — | — | — |
| | THICKNESS [μm] | | 47 | 50 | 50 | 50 | 50 | 50 | 49 | 41 | 35 |
| SKIN LAYER | RESIN (B) | B-1 | — | — | — | — | — | — | — | — | — |
| | | B-2 | — | — | — | — | — | — | — | — | — |
| | MASTER BATCH (C) | C-2 | 100 | — | — | — | — | — | 100 | 100 | 100 |
| | | C-3 | — | — | — | — | — | — | — | — | — |
| | | C-4 | — | — | — | — | — | — | — | — | — |
| | | C-5 | — | — | — | — | — | — | — | — | — |
| | THICKNESS [μm] | | 1.5 | — | — | — | — | — | 0.5 | 4.5 | 7.4 |
| TOTAL THICKNESS OF FILM [μm] | | | 50 | 50 | 50 | 50 | 50 | 50 | 50 | 50 | 50 |
| COMPATIBILITY BETWEEN ELASTOMER (A) AND RESIN (B) | | | PRESENT | — | — | — | — | — | PRESENT | PRESENT | PRESENT |
| PRESENCE OR ABSENCE OF BLOCKING | ORDINARY TEMPERATURE | | ABSENT | | | | | | ABSENT | ABSENT | ABSENT |
| | HIGH TEMPERATURE | | ABSENT | PRESENT | PRESENT | PRESENT | PRESENT | PRESENT | PARTIALLY PRESENT | ABSENT | ABSENT |
| PERMANENT DEFORMATION [%] | MD | | 34 | 29 | 39 | 43 | 52 | 58 | 32 | 53 | 99 |
| | TD | | 30 | 25 | 33 | 26 | 29 | 32 | 27 | 43 | 85 |
| CONTRACTION FORCE AT TIME OF STRETCHING 200% [N/25 mm] | MD | | 6.95 | 6.49 | 7.09 | 7.44 | 7.53 | 7.78 | 6.36 | 6.73 | 8.74 |
| | TD | | 2.87 | 3.34 | 3.64 | 3.60 | 3.84 | 4.05 | 3.09 | 3.78 | 4.57 |
| SURFACE SLIPPERINESS | | | EXCELLENT | POOR | POOR | POOR | POOR | POOR | EXCELLENT | EXCELLENT | EXCELLENT |

TABLE 4

|  |  |  | EXAMPLE 28 | EXAMPLE 29 | EXAMPLE 30 | EXAMPLE 31 | EXAMPLE 32 | EXAMPLE 33 | EXAMPLE 34 |
|---|---|---|---|---|---|---|---|---|---|
| STRETCHABLE FILM LAYER | ELASTOMER (A) | A-1 | 100 | 100 | 100 | 100 | 100 | 100 | 100 |
| | | A-2 | — | — | — | — | — | — | — |
| | | A-3 | — | — | — | — | — | — | — |
| | | A-4 | — | — | — | — | — | — | — |
| | MASTER BATCH (C) | C-1 | — | — | — | — | — | — | — |
| | | C-2 | — | — | — | — | — | — | — |
| | | C-3 | — | — | — | — | — | — | — |
| | THICKNESS [μm] | | 34 | 29 | 34 | 38 | 36 | 17 | 17 |

TABLE 4-continued

| | | | EXAMPLE 28 | EXAMPLE 29 | EXAMPLE 30 | EXAMPLE 31 | EXAMPLE 32 | EXAMPLE 33 | EXAMPLE 34 |
|---|---|---|---|---|---|---|---|---|---|
| SKIN LAYER | RESIN (B) | B-1 | — | — | — | — | — | — | — |
| | | B-2 | — | — | — | — | — | — | — |
| | | B-3 | — | — | — | — | — | 70 | — |
| | MASTER BATCH (C) | C-2 | 100 | 100 | 100 | 100 | 100 | 30 | 100 |
| | | C-3 | — | — | — | — | — | — | — |
| | | C-4 | — | — | — | — | — | — | — |
| | | C-5 | — | — | — | — | — | — | — |
| | THICKNESS [μm] | | 0.5 | 1 | 3 | 4 | 4 | 7 | 7 |
| TOTAL THICKNESS OF FILM [μm] | | | 35 | 31 | 40 | 46 | 44 | 31 | 31 |
| COMPATIBILITY BETWEEN ELASTOMER (A) AND RESIN (B) | | | PRESENT | PRESENT | PRESENT | PRESENT | PRESENT | PRESENT | PRESENT |
| PRESENCE OR ABSENCE OF BLOCKING | ORDINARY TEMPERATURE | | ABSENT | ABSENT | ABSENT | ABSENT | ABSENT | ABSENT | ABSENT |
| | HIGH TEMPERATURE | | PARTIALLY PRESENT | ABSENT | ABSENT | ABSENT | ABSENT | ABSENT | ABSENT |
| PERMANENT DEFORMATION [%] | MD | | 20 | 23 | 38 | 38 | 47 | 118 | 112 |
| | TD | | 24 | 27 | 39 | 39 | 45 | 111 | 99 |
| CONTRACTION FORCE AT TIME OF STRETCHING 200% [N/25 mm] | MD | | 4.19 | 3.82 | 5.41 | 6.50 | 6.64 | 8.26 | 5.98 |
| | TD | | 2.45 | 2.10 | 3.26 | 3.92 | 3.97 | 4.01 | 3.00 |
| SURFACE SLIPPERINESS | | | EXCELLENT | EXCELLENT | EXCELLENT | EXCELLENT | EXCELLENT | EXCELLENT | EXCELLENT |

TABLE 5

| | | | EXAMPLE 35 | EXAMPLE 36 | EXAMPLE 37 | EXAMPLE 38 | EXAMPLE 39 |
|---|---|---|---|---|---|---|---|
| STRETCHABLE FILM LAYER | ELASTOMER (A) | A-1 | — | — | — | — | — |
| | | A-2 | — | — | — | — | — |
| | | A-3 | — | — | — | — | — |
| | | A-4 | — | — | — | — | — |
| | | A-5 | 94 | 94 | 94 | 94 | 94 |
| | MASTER BATCH (C) | C-1 | — | — | — | — | — |
| | | C-2 | 5 | 5 | 5 | 5 | 5 |
| | | C-3 | — | — | — | — | — |
| | AMIDE-BASED ANTIBLOCKING AGENT (D) | D-1 | 1 | 1 | 1 | 1 | 1 |
| | THICKNESS [μm] | | 31.2 | 26.2 | 21.2 | 16.2 | 30 |
| SKIN LAYER | RESIN (B) | B-1 | — | — | — | — | — |
| | | B-2 | — | — | — | — | — |
| | | B-3 | — | — | — | — | — |
| | MASTER BATCH (C) | C-2 | 100 | 100 | 100 | 100 | — |
| | | C-3 | — | — | — | — | — |
| | | C-4 | — | — | — | — | — |
| | | C-5 | — | — | — | — | — |
| | THICKNESS [μm] | | 0.4 | 0.4 | 0.4 | 0.4 | — |
| TOTAL THICKNESS OF FILM [μm] | | | 37 | 27 | 22 | 17 | 30 |
| COMPATIBILITY BETWEEN ELASTOMER (A) AND RESIN (B) | | | — | — | — | — | — |
| PRESENCE OR ABSENCE OF BLOCKING | ORDINARY TEMPERATURE | | ABSENT | ABSENT | ABSENT | ABSENT | ABSENT |
| | HIGH TEMPERATURE | | ABSENT | ABSENT | ABSENT | ABSENT | ABSENT |
| PERMANENT DEFORMATION [%] | MD | | — | — | — | — | — |
| | TD | | 32 | 34 | 34 | 33 | 27 |
| CONTRACTION FORCE AT TIME OF STRETCHING 200% [N/25 mm] | MD | | — | — | — | — | — |
| | TD | | 2.37 | 1.93 | 1.64 | 1.51 | 2.00 |
| SURFACE SLIPPERINESS | | | EXCELLENT | EXCELLENT | EXCELLENT | EXCELLENT | POOR |

As shown in Table 1 to Table 3, both of the olefin-based elastomer (A) and the resin (B) (here, also including the base resin of the master batch (C)) used in Example 1 to Example 19 and Example 25 to Example 27 had compatibility.

In the stretchable films of Example 1 to Example 19 which were the stretchable film of the present invention, the occurrence of the blocking was suppressed even in a case of performing high temperature storage, the permanent deformation was sufficiently small, and the contraction force at the time of stretching 200% was also sufficient. In addition, in the stretchable films of Example 1 to Example 17, and Example 19 where a film total thickness was less than or equal to 150 µm, the contraction force at the time of stretching 200% was appropriate without exceeding 10 N/25 mm, compared to the stretchable film of Example 18 where a film total thickness was greater than 150 µm.

In contrast, in the stretchable films of Example 20 to Example 24 where the skin layer was not disposed, the occurrence of the blocking was observed in a case of performing high temperature storage.

In the stretchable films of Example 26 and Example 27 where the thickness of the skin layer was greater than or equal to 4.5 µm, the permanent deformation was large, and the physical properties of a film deteriorated.

As shown in Table 4 and Table 5, in the stretchable films of Example 28 to Example 32 and Example 35 to Example 38, the occurrence of the blocking was suppressed even in a case of performing high temperature storage, the permanent deformation was sufficiently small, and the contraction force at the time of stretching 200% was also sufficient.

In contrast, in the stretchable films of Example 33 and Example 34 where the thickness of the skin layer was greater than or equal to 4.5 µm, the permanent deformation was large, and the physical properties of a film deteriorated.

In the stretchable film of Example 39 where the skin layer was not disposed, the surface slipperiness was not sufficient.

INDUSTRIAL APPLICABILITY

In the stretchable film of the present invention, the physical properties of a film are sufficient, and the occurrence of the blocking was sufficiently suppressed even in a case of performing high temperature storage. For this reason, it is possible to preferably use the stretchable film of the present invention in a sanitation field and a healthcare field. For example, it is possible to use the stretchable film of the present invention in a disposable diaper tab having stretching properties, a side panel of training pants, a leg gather, a sanitary product, swimming trunks, an incontinence product, a veterinary product, a bandage, tightening cloth, a surgical drape, a sterile cover, wiping cloth, and the like.

REFERENCE SIGNS LIST 1 stretchable film
10 stretchable film layer
10a first surface
10b second surface
12 first skin layer
14 second skin layer

The invention claimed is:
1. A stretchable film, comprising:
a stretchable film layer;
a first skin layer disposed on the stretchable film layer on a first surface side; and
a second skin layer disposed on the stretchable film layer on a second surface side,
wherein the stretchable film layer contains an elastomer, the thickness of the stretchable film layer is 46 to 148.6 µm,
the first skin layer and the second skin layer contain a resin which does not have adhesiveness at 60° C.,
the thickness of each of the first skin layer and the second skin layer is 0.1 µm to 2 µm,
an amount of the resin in each of the first and second skin layers is 15 mass % to 90 mass %,
a ratio of the thickness of the stretchable film layer with respect to the thickness of the first skin layer or the second skin layer is 23:1 to 1486:1, and
the stretchable film is extensible in both a machine direction and a transverse direction.

2. The stretchable film according to claim 1, wherein the elastomer contained in the stretchable film layer is an olefin-based elastomer.

3. The stretchable film according to claim 2, wherein each resin contained in the first skin layer and the second skin layer has compatibility with respect to the elastomer.

4. The stretchable film according to claim 3, wherein the first skin layer and the second skin layer are layers containing any one or both of polyethylene and polypropylene.

5. The stretchable film according to claim 2, wherein a total thickness of the film is 8 µm to 150 µm.

6. The stretchable film according to claim 2, wherein the first skin layer and the second skin layer are layers containing any one or both of polyethylene and polypropylene.

7. The stretchable film according to claim 1, wherein the elastomer contained in the stretchable film layer is a styrene-based elastomer.

8. The stretchable film according to claim 7, wherein a total thickness of the film is 8 µm to 150 µm.

9. The stretchable film according to claim 7, wherein the first skin layer and the second skin layer are layers containing any one or both of polyethylene and polypropylene.

10. The stretchable film according to claim 1, wherein a total thickness of the film is 8 µm to 150 µm.

11. The stretchable film according to claim 10, wherein the first skin layer and the second skin layer are layers containing any one or both of polyethylene and polypropylene.

12. The stretchable film according to claim 1, wherein the first skin layer and the second skin layer are layers containing any one or both of polyethylene and polypropylene.

13. The stretchable film according to claim 1,
wherein the stretchable film layer comprises 70 mass % or more of at least one copolymer selected from a group consisting of an α-olefin homopolymer,
the stretchable film layer comprises a stearic acid amide,
the first and second skin layers each have the same composition, and
the first and second skin layers each comprise a calcium carbonate.

14. The stretchable film according to claim 1, wherein the stretchable film layer comprises 80 mass % or more of any one selected from a group consisting of a propylene-ethylene copolymer, an ethylene-octene copolymer, and a styrene-isoprene-styrene block copolymer,
the stretchable film layer comprises at least a stearic acid amide or a calcium carbonate,
the first and second skin layers each have the same composition, and
the first and second skin layers each comprise at least one selected from the group consisting of a calcium carbonate, a zeolite, a silica, and a glass.

15. The stretchable film according to claim 1, wherein the stretchable film layer is made of any one selected from a group consisting of a propylene-ethylene copolymer, an ethylene-octene copolymer, and a styrene-isoprene-styrene block copolymer,
the first and second skin layers each have the same composition, and the first and second skin layers each comprise at least one selected from a group consisting of a calcium carbonate, a zeolite, a silica, and a glass.

16. The stretchable film according to claim 1,
wherein the stretchable film layer comprises 80 mass % or more of any one selected from a group consisting of a propylene-ethylene copolymer, an ethylene-octene copolymer, and a styrene-isoprene-styrene block copolymer,
the first and second skin layers each have the same composition, and
the first and second skin layers are each made of a calcium carbonate and a polyethylene.

17. The stretchable film according to claim 1, wherein each of the first and second skin layers further comprises an inorganic antiblocking agent.

18. The stretchable film according to claim 1, wherein the stretchable film layer further comprises an inorganic antiblocking agent.

19. The stretchable film according to claim 1, wherein the stretchable film is wound into a shape of a roll.

* * * * *

UNITED STATES PATENT AND TRADEMARK OFFICE
CERTIFICATE OF CORRECTION

PATENT NO. : 10,919,277 B2  
APPLICATION NO. : 15/326877  
DATED : February 16, 2021  
INVENTOR(S) : Hideaki Takahashi et al.

It is certified that error appears in the above-identified patent and that said Letters Patent is hereby corrected as shown below:

On the Title Page

On Page 2, Column 2, Item (56), Line 7, under Other Publications, delete "Patenet" and insert --Patent--.

In the Specification

In Column 1, Line 49, after "2010-279725" insert --.--.

In Column 7, Line 16 (Approx.), delete "itself" and insert --itself.--.

In Column 9, Line 55, delete "Corporation)" and insert --Corporation).--.

In Column 10, Line 19, delete "%," and insert --%),--.

In Column 10, Line 22, delete "%," and insert --%),--.

In Column 10, Line 37, delete "(c-2)" and insert --(C-2)--.

In Column 12, Line 20, delete ""Absent"" and insert --"Absent".--.

In Column 12, Line 25, delete "fractured)" and insert --fractured).--.

In Column 12, Line 30, delete "Presents"" and insert --Presents".--.

In the Claims

In Column 20, Line 43, Claim 13, after "homopolymer," insert --an α-olefin copolymer and an ethylene-α-olefin-diene terpolymer,--.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*